United States Patent
Chae

(10) Patent No.: US 6,465,989 B1
(45) Date of Patent: Oct. 15, 2002

(54) APPARATUS FOR INTEGRATING SWITCH PORTS IN AN ATM SWITCHING SYSTEM

(75) Inventor: Sang-Soo Chae, Songnam (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/472,561

(22) Filed: Dec. 27, 1999

(30) Foreign Application Priority Data

Dec. 30, 1998 (KR) .......................................... 98-60850

(51) Int. Cl.[7] .............................................. H04L 12/28
(52) U.S. Cl. ...................................................... 320/398
(58) Field of Search ................................. 370/395–399, 370/230–236, 477, 390, 413, 229; 379/134; 709/234, 231–233; 710/52, 15, 34–35, 68; 712/24, 15, 200

(56) References Cited

U.S. PATENT DOCUMENTS

| | | | | |
|---|---|---|---|---|
| 5,144,619 A | * | 9/1992 | Munter | 370/398 |
| 5,245,614 A | * | 9/1993 | Gutman et al. | 370/477 |
| 5,452,297 A | * | 9/1995 | Hiller et al. | 370/395 |
| 5,668,798 A | * | 9/1997 | Toubol et al. | 370/230 |
| 5,831,973 A | * | 11/1998 | Yokotani et al. | 370/236 |
| 5,931,938 A | * | 8/1999 | Drogichen et al. | 712/15 |
| 6,061,330 A | * | 5/2000 | Johansson | 370/229 |
| 6,178,235 B1 | * | 1/2001 | Peterson et al. | 379/134 |

* cited by examiner

*Primary Examiner*—Kwang Bin Yao
*Assistant Examiner*—Prenell Jones
(74) *Attorney, Agent, or Firm*—Klauber & Jackson; Steve Cha

(57) ABSTRACT

An apparatus for integrating the switch ports in an ATM (Asynchronous Transfer Mode) switching system, the apparatus comprising a cell controller for controlling input cells by the output port information of the routing information obtained from the input cells, a plurality of bundle registers for generating write enable signals with the values specified by the present counter upon receiving a valid integrated output port information through the cell controller, and a plurality of write enable signal generators for applying the write enable signals to the address FIFO's of corresponding switch ports.

12 Claims, 4 Drawing Sheets

FIG. 3A   FIG. 3B   FIG. 3C   FIG. 3D   FIG. 3E

|   | 0 |
|---|---|
| 0 | 0000 |
| 1 | 0001 |
| 2 | 0010 |
| 3 | 0011 |

0 | 0100
0 | 0101
0 | 0110
0 | 0111

APPARATUS FOR INTEGRATING SWITCH PORTS IN AN ATM SWITCHING SYSTEM

CLAIM OF PRIORITY

This application makes reference to, incorporates the same herein, and claims all benefits accruing under 35 U.S.C. Section 119 from an application for APPARATUS FOR INTEGRATING SWITCH PORTS IN AN ATM SWITCHING SYSTEM filed earlier in the Korean Industrial Property Office on the Dec. 30, 1998 and there duly assigned Serial No. 60850/1998.

BACKGROUND OF THE INVENTION

1. Field of the Invention

The present invention relates to an apparatus for integrating switch ports to provide a multi-stage switch structure enabling a variety of switch combinations to accommodate various traffic types in an ATM (Asynchronous Transfer Mode) switching system.

2. Description of the Related Art

Generally, an ATM switch having a shared memory structure is functionally limited by the size and/or the speed of each switch port. Buffers are provided for each port for storing cells prior to readout. The port speed is limited by "n" if the chip is formed by n ×n switches, and such integrated service is hard to maintain the cell ordering when connecting a subscriber with a different speed under STM-4c or STM-16c that are faster than its allocated port speed.

SUMMARY OF THE INVENTION

It is an object of the present invention to provide an apparatus for integrating the switch ports in the ATM switching system.

It is another object of the present invention to provide an apparatus for obtaining a variety of ATM switch connections by a small-scale chip in the ATM switching system.

It is still another object of the present invention to provide an apparatus for improving the link efficiency in the ATM switching system.

It is further another object of the present invention to provide an apparatus for connecting with a subscriber whose input rate is faster than the allocated switch port speed in the ATM switching system.

According to one aspect of the present invention, an apparatus for integrating the switch ports in an ATM (Asynchronous Transfer Mode) switching system includes a cell controller for controlling input cells by the output port information of the routing information obtained from the input cells; a plurality of bundle registers for generating write enable signals with the values specified by the present counter upon receiving a valid integrated output port information via the cell controller; and, a plurality of write enable signal generators for applying the write enable signals to the address FIFO's of corresponding switch ports.

The foregoing and other objects, features, and advantages of the invention will be apparent from the following, more detailed description of the preferred embodiments illustrated in the accompanying drawings. The present invention will now be described more specifically with reference to the drawings attached only by way of example.

A BRIEF DESCRIPTION OF THE ATTACHED DRAWINGS

Figure 4:
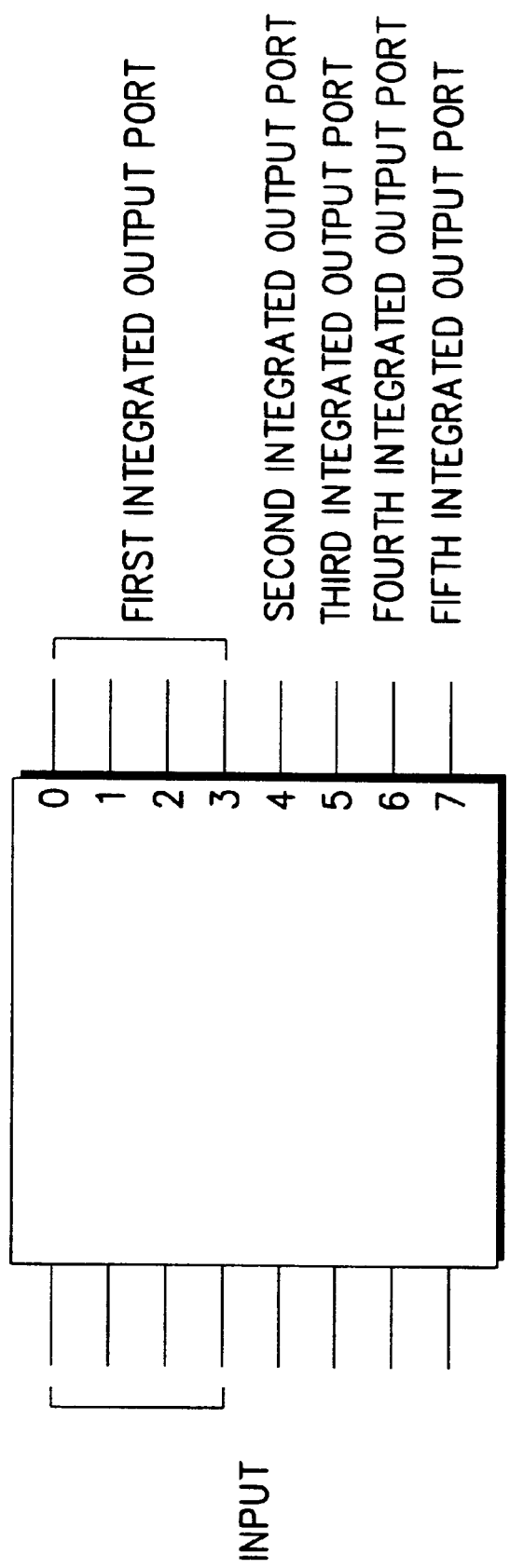

FIGS. 3A to 3E schematically illustrate the bundle registers that are structured according to the present invention; and, FIG. 4 is a diagram for illustrating the connection of an apparatus for integrating the switch ports in an ATM switching system according to the present invention.

A DETAILED DESCRIPTION OF THE PREFERRED EMBODIMENT

In the following description, for purposes of explanation rather than limitation, specific details are set forth such as particular architecture, interfaces, techniques, etc., in order to provide a thorough understanding of the present invention. However, it will be apparent to those skilled in the art that the present invention may be practiced in other embodiments that depart from these specific details. For the purpose of clarity, detailed descriptions of well-known devices, circuits, and methods are omitted so as not to obscure the description of the present invention with unnecessary detail.

Figure 1:
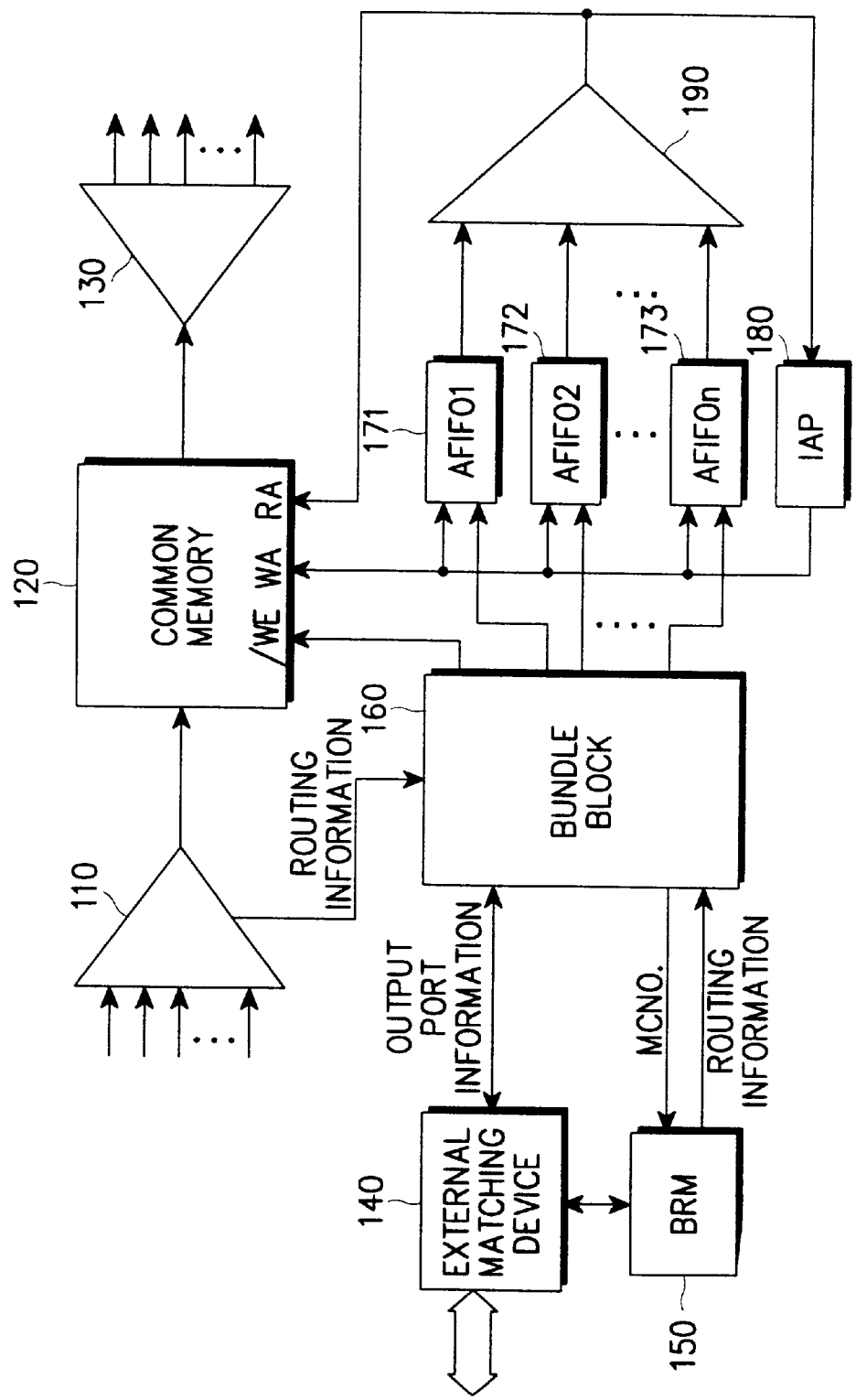
FIG. 1 is a block diagram for illustrating an ATM switching system according to the present invention.

Referring to FIG. 1, the cells inputted through the input ports are multiplexed by a multiplexer 110 and stored into a common memory 120. Meanwhile, the multiplexer 110 extracts the routing information of the input cells such as the traffic class and the integrated output port, and delivers them to a bundle block 160.

An external matching device 140 serves to deliver the data identifying the switch output port information as set by the operating manager of the switching system to backward resource management (BRM) 150 and the bundle block 160. The bundle block 160 delivers the write enable signal to the address of FIFO next to the most lately written address according to the information of each integrated output port. An idle address pool 180 stores the idle addresses of the common memory 120 to supply a write address both to the common memory 120 and the address FIFO. The write address is stored into the address FIFO of the corresponding output port responsive to the write enable signal.

When outputting cells, all the address FIFO's 171~17n generate simultaneously respective output addresses and multiplexed to the common memory 120 as read addresses, then the addresses are restored into the idle address pool 180. The cells outputted from the common memory 120 are sequentially delivered through a demultiplexer 130 to corresponding output ports. Meanwhile, if the input cells were multicast cells, the bundle block 160 extracts the multicast cell identification number MCNo from the input cells, instead of the information of the integrated output port, and supplies the MCNo as a read addresses of BRM 150 to obtain the information of the integrated output port. This operation is the only difference between the multicast and the unicast cells.

Figure 2:
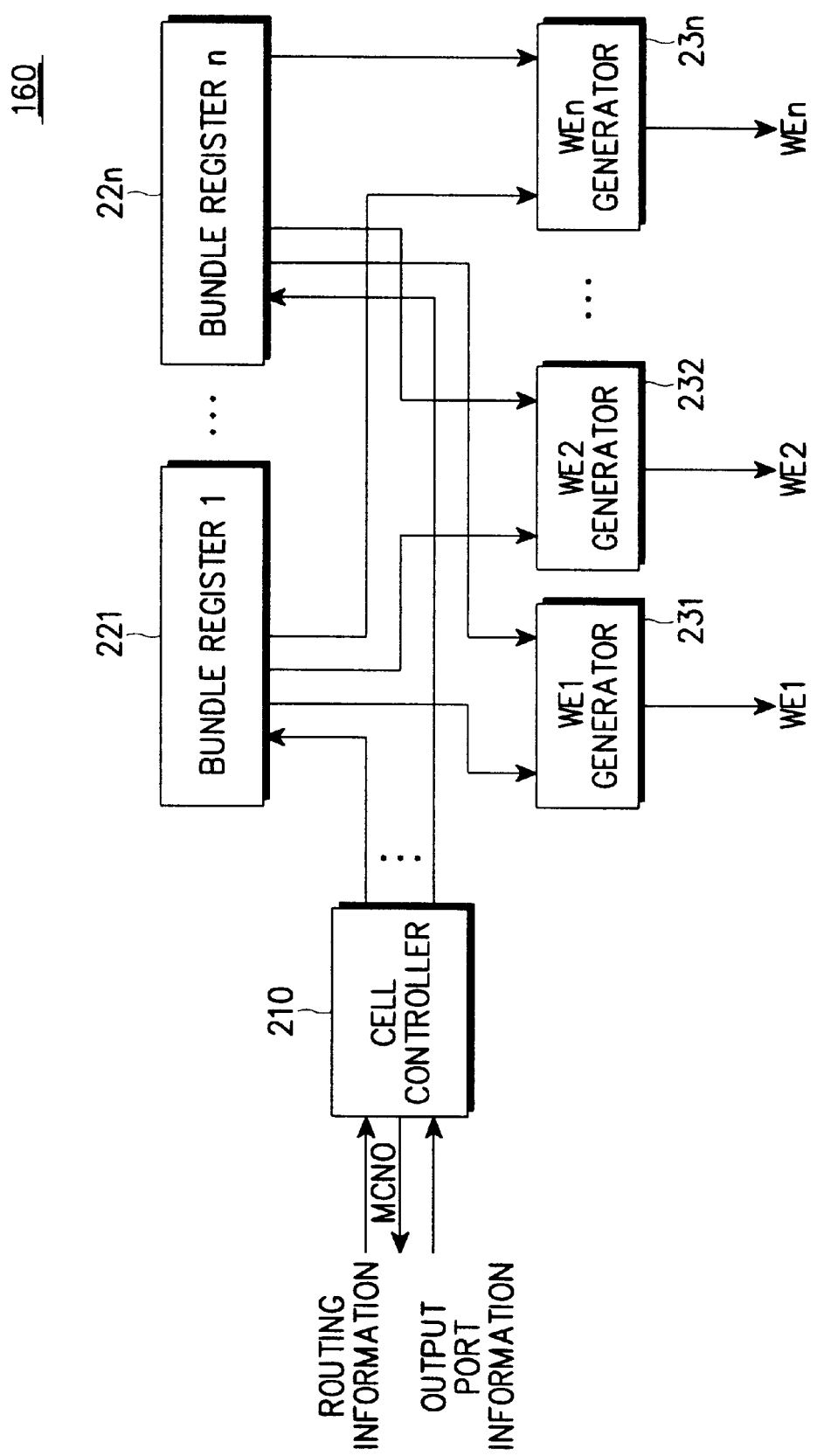
FIG. 2 is a block diagram for illustrating an apparatus for integrating the switch ports in an ATM switching system according to the present invention.

Referring to FIG. 2, the bundle block 160 includes a cell controller 210, a plurality of bundle registers 221~22n, and a plurality of write enable generators 231~23n. The cell controller 210 delivers the information of the integrated output port of the input unicast cell to the corresponding bundle register. Alternatively, when a multicast cell is inputted, the cell controller 210 delivers the multicast cell identification number MCNo to BRM 150 to retrieve the information of the corresponding integrated output port that is to be applied to the corresponding bundle register.

Upon receiving valid information from the cell controller 210, the bundle registers 221~22n generate the write enable signals to the address FIFO next to the most lately accessed address FIFO according to the counter value, then increases the counter value. Each of the bundle registers 221~22n includes a register for storing the information of the integrated output port, i.e. the number of the ports integrated and a counter for indicating the bundle register.

The write enable signal generators 231~231n collectively receive the write enable signals generated from the bundle registers 221~22n and transfer the write enable signals to the corresponding address FIFO's. Thus, the input cell is stored into the common memory 120 while the address FIFO stores the location/address of the common memory 120 where the cell is stored. At a specified time, the address FIFO delivers the location/address to the common memory 120 as a read address to read out the corresponding input cell, which is then transferred through the demultiplexer 130 to the corresponding switch output port.

In accordance with the embodiment of the present invention, a description of the integration of four ports, each having an input rate of 155 Mbps in the 8×8 switch as a port of 622 Mbps, is made in connection with FIGS. 1 to 4. The bundle block 160 writes the information of the integrated ports of the switch initialized by the external matching device 140 into the bundle registers of the chip. For example, if each of the integrating four switch ports is numbered 0 to 3, respectively, a first bundle register 221 has four ports integrated thereon. In this case, the first bundle register 221 has a counter initialized to "0", and register 0 storing data "0000", register 1 storing data "0001", register 2 storing data "0010," and register 3 storing data "0011" to specify the sequence of each output switch port, as shown in FIG. 3A. Similarly, the second bundle register 222 has a counter initialized to "0", and register 0 storing data "0100" to specify the sequence of the output switch port, as shown in FIG. 3B. The third bundle register 223 has a counter initialized to "0", and register 0 storing data "0101" to specify the sequence of the output switch port, as shown in FIG. 3C. The fourth bundle register 224 has a counter initialized to "0", and register 0 storing data "0110" to specify the sequence of the output switch port, as shown in FIG. 3D. Finally, the fifth bundle register 225 has a counter initialized to "0", and register 0 storing data "0111" to specify the sequence of the output switch port, as shown in FIG. 3E.

Thus, the first bundle register 221 has four ports integrated therein, sequentially repeating the counter values 0~3. As shown in FIG. 3A, the port is designated by the counter value. The counter value of "0" refers to the switch port 0 corresponding to the register 0, the counter value "1" refers to the switch port 1 corresponding to the register 1, the counter value "2" refers to the switch port 2 corresponding to the register 2, and the counter value "3" refers to the switch port 3 corresponding to the register 3.

The second bundle register 222 has a single integrated port, repeating the counter value "0", designating the switch port 4 corresponding to the register 0, as shown in FIG. 3B. The third bundle register 223 has a single integrated port, repeating the counter value "0", designating the switch port 5 corresponding to the register 0, as shown in FIG. 3C. The fourth bundle register 224 has a single integrated port, repeating the counter value "0", designating the switch port 6 corresponding to the register 0, as shown in FIG. 3D. Finally, the fifth bundle register 225 has a single integrated port, repeating the counter value "0", designating the switch port 7 corresponding to the register 0, as shown in FIG. 3E.

Thus, the apparatus for integrating the switch ports reconstructs the 8×8 switch as a 5×5 switch to obtain the virtual 622 Mbps port with the actual 8 ports. Namely, the output ports numbered 0 to 3 of the physical 8×8 switch are designated as a single output port numbered 0 of the logical 5×5 switch, so that the cells outputted through the first integrated port are actually delivered through the physical switch ports 0 to 3. In this case, the cells are delivered orderly through in the sequence of the switch ports numbered 0 to 3.

In operation, upon receiving the information of the integrated output port with the initial counter value "0", the first bundle register 221 delivers the write enable signal to the address FIFO corresponding to the output port number stored in the first register, then increases the counter value to "1". Likewise, upon receiving the subsequent cell transferred to the first integrated output port, it delivers the write enable signal to the address FIFO corresponding to the output port number stored in the second register, then increasing the counter value to "2". Accordingly, the input cell is stored into the common memory 120 while the address of the common memory storing the cell is written in the address FIFO, which is then delivered at a specified time as a read address to the common memory 120 for eventual transmission through the demultiplexer 130.

As is apparent from the foregoing, the output ports numbered 0 to 3 are logically assumed as a single integrated port in the switch structure, sequentially allotting the cells continuously delivered to the integrated port 0 in order to maintain the sequence of the cells. This integrated port enables the switch to match a subscriber of higher speed and to improve the port efficiency having an entry for multistage/multicast connection. As described above, the multicast cell is tagged with the identification number MCNo and delivered to the bundle block 160 to retrieve the information of the integrated output port of the cell to be associated by employing MCNo as the read address.

Thus, the invention provides a means to integrate a plurality of switch ports in an ATM switching system so that a continuous cell stream inputted for a call may be bundled through multiple ports integrated into a single logical port to obtain a higher speed than the speed of a physical port.

While the present invention has been described in connection with specific embodiments accompanied by the attached drawings, it will be readily apparent to those skilled in the art that various changes and modifications may be made thereto without departing the gist of the present invention.

What is claimed is:

1. An apparatus for integrating the switch ports in an ATM (Asynchronous Transfer Mode) switching system of the type having a common memory, said apparatus comprising:

a cell controller for generating integrated output port information in response to the routing information obtained from said input cells;

a plurality of bundle registers having a counter for generating, upon receiving said integrated output port information from said cell controller, write enable signals responsive to the values specified in said respective counter; and, a plurality of write enable signal generators for applying said write enable signals from said plurality of bundle registers to corresponding address of a plurality of FIFOs, wherein one of said plurality of bundle registers comprises a plurality of ports integrated thereon so that said input cells outputted through said one bundle register are delivered through said plurality of ports in sequence.

2. The apparatus for integrating the switch ports as defined in claim 1, wherein said cell controller generates said integrated output port information that has an entry for a multicast connection in response to an identification number of multi-cast cells if said input cell is said multi-cast cells.

3. The apparatus for integrating the switch ports as defined in claim 1, wherein said write enable signal generators collectively receive said write enable signals generated from said bundle registers in order to transfer said write enable signals to corresponding said address of said plurality of FIFOs.

4. The apparatus for integrating the switch ports as defined in claim 3, said write enable signals represent the addresses of said common memory for storing said input cells.

5. An apparatus for integrating the switch ports in an ATM (Asynchronous Transfer Mode) switching system, said apparatus comprising:
   a common memory for buffering a plurality of input cells to be read out at a predetermined time;
   an external matching device for providing an integrated output port information associated with said input cells;
   a cell controller coupled to said external matching device for analyzing the routing information of said input cells and for buffering said input cells according to said routing information provided in said input cells;
   a plurality of bundle registers having a counter and coupled to said cell controller for generating, upon receiving said integrated output port information from said external matching device via said cell controller, write enable signals responsive to the values specified in said respective counter; and,
   a plurality of write enable signal generators for applying said write enable signals from said plurality of bundle registers to corresponding address of a plurality of FIFOs.

6. The apparatus for integrating the switch ports as defined in claim 5, said apparatus further comprising a management means coupled to said matching device and said cell controller for providing current digestive information of said switch ports.

7. The apparatus for integrating the switch ports as defined in claim 5, said apparatus further comprising an idle data structure coupled to said common memory and said plurality of FIFOs for managing the memory location of said common memory and for storing said input cells as specified in said idle data structure.

8. The apparatus for integrating the switch ports as defined in claim 5, wherein said input cells comprise an unicast cell and multi-cast cells.

9. The apparatus for integrating the switch ports as defined in claim 6, wherein said management means extracts an identification number of multi-cast cells if said input cells are said multi-cast cells.

10. The apparatus for integrating the switch ports as defined in claim 9, wherein said controller generates said integrated output port information that has an entry for a multicast connection in response to said identification number of said multi-cast cells.

11. The apparatus for integrating the switch ports as defined in claim 5, wherein said write enable signal generators collectively receive said write enable signals generated from said bundle registers in order to transfer said write enable signals to corresponding address of said plurality of FIFOs.

12. The apparatus for integrating the switch ports as defined in claim 11, wherein said write enable signals represent the addresses of said common memory for storing said input cells.

* * * * *